(12) United States Patent
MacFarland

(10) Patent No.: US 6,332,261 B1
(45) Date of Patent: Dec. 25, 2001

(54) PROCESS FOR THE ATTACHMENT OF A MOUNTING RAIL AS WELL AS A CONNECTING DEVICE FOR A MOUNTING RAIL

(75) Inventor: David MacFarland, Unterschleissheim (DE)

(73) Assignee: Dura Convertible Systems GmbH, Cologne (DE)

(*) Notice: Subject to any disclaimer, the term of this patent is extended or adjusted under 35 U.S.C. 154(b) by 0 days.

(21) Appl. No.: 09/340,483

(22) Filed: Jun. 30, 1999

(51) Int. Cl.[7] .................................................. B23P 11/00
(52) U.S. Cl. ........................... 29/510; 29/525.06; 403/279
(58) Field of Search ................................. 29/510, 525.05, 29/525.06, 243.517, 243.53, 243.54, 890.044, 897.2; 403/279, 281, 282; 296/120.1, 121, 222

(56) References Cited

U.S. PATENT DOCUMENTS

| | | | |
|---|---|---|---|
| 2,071,507 | * 2/1937 | Dews | 29/510 |
| 3,119,435 | * 1/1964 | Greenman | 29/243.517 |
| 3,149,530 | * 9/1964 | Kolec | 29/510 |
| 3,414,965 | * 12/1968 | Stau et al. | 29/510 |
| 3,463,046 | * 8/1969 | Welch et al. | 29/510 |
| 3,563,183 | 2/1971 | Rich . | |
| 4,746,163 | 5/1988 | Muscat . | |
| 4,767,248 | * 8/1988 | Pratt | 29/525.06 |
| 4,810,142 | * 3/1989 | Briles | 29/525.06 |
| 4,967,463 | * 11/1990 | Pratt | 29/525.06 |
| 5,015,136 | * 5/1991 | Vetter et al. | 29/525.06 |
| 5,035,041 | * 7/1991 | Matuschek | 29/525.06 |
| 5,365,654 | * 11/1994 | Moulton | 29/243.53 |
| 5,680,790 | * 10/1997 | Richardson et al. | 29/243.53 |

FOREIGN PATENT DOCUMENTS 27 07 291 A1   8/1978   (DE) .

* cited by examiner

Primary Examiner—S. Thomas Hughes
Assistant Examiner—T. Nguyen
(74) Attorney, Agent, or Firm—Gardner, Carton & Douglas

(57) ABSTRACT

The present invention relates to a process for the attachment of a mounting rail, as well as to a connecting device for a mounting rail. In the process for the attachment of a mounting rail to a rod which is, if necessary, at least partially premounted, of a folding top for a motor vehicle, particularly for a convertible, a tubular connecting element (7, 7'), which has at least one stopping surface (stopping surface [11]), is inserted through a hole (5) in the mounting rail (3). The tubular connecting element (7, 7') is inserted through an additional hole (25) in the rod (23) and secured in its position, and the mounting rail (3) is moved forward up to a predetermined position on the rod (23), whereby the tubular connecting element (7, 7') is plastically deformed and a connection between the rod and the mounting rail is brought about. The connecting device in accordance with the invention comprises a tubular connecting element (7, 7'), which extends both through a hole (5) in the mounting rail (3) as well as through a hole (25) in the rod (23) and is, during the production of the connection point (40), least partially plastically deformed.

4 Claims, 2 Drawing Sheets

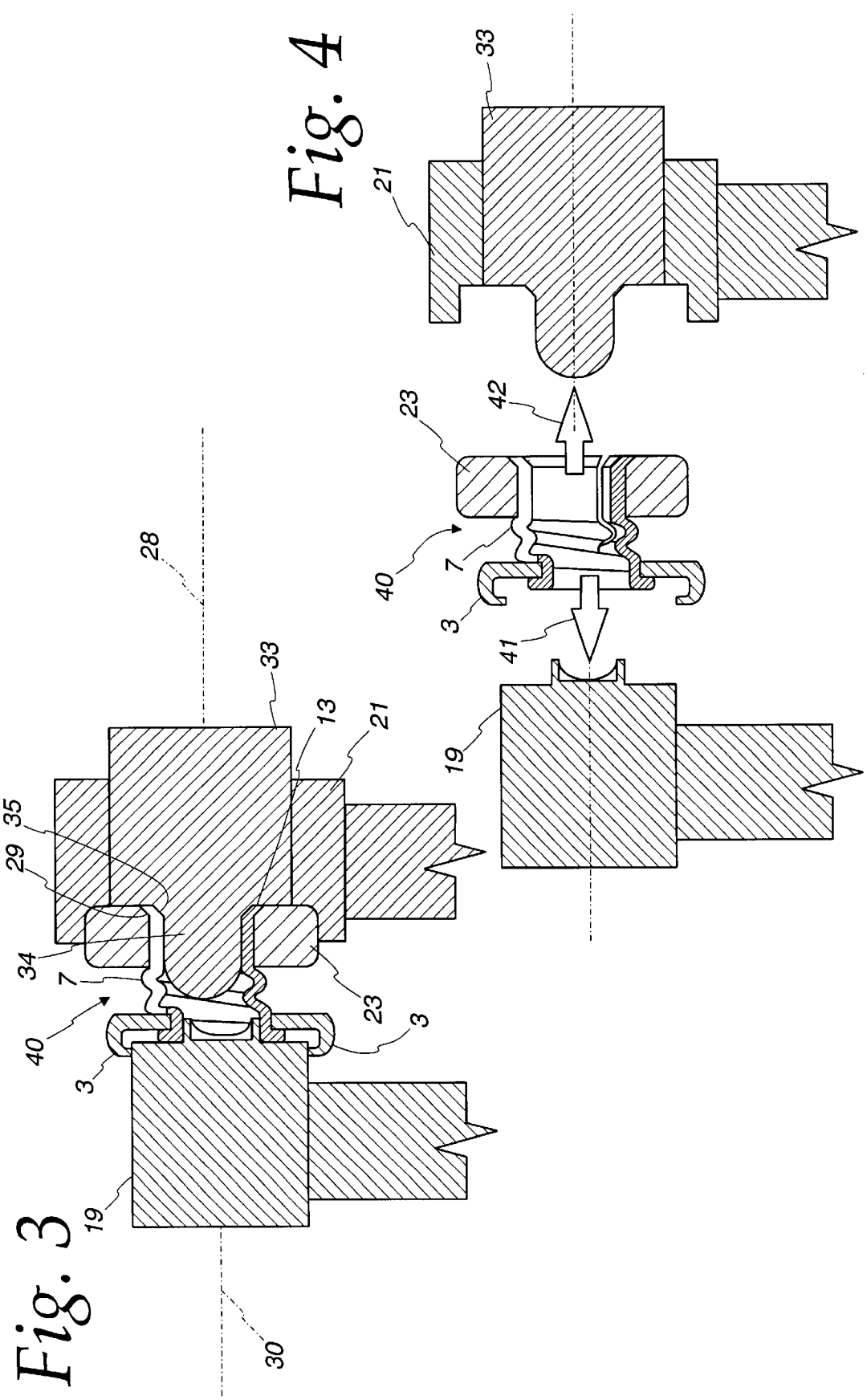

PROCESS FOR THE ATTACHMENT OF A MOUNTING RAIL AS WELL AS A CONNECTING DEVICE FOR A MOUNTING RAIL

BACKGROUND OF THE INVENTION

The present invention relates to a process for the attachment of a mounting rail to the rod of a folding top for a motor vehicle, particularly of a convertible, which rod is at least partially premounted, if necessary. The present invention additionally concerns a connecting device for a mounting rail for the connection of the rod to a folding top of a motor vehicle, particularly of a convertible, which rod is at least partially premounted, if necessary.

In folding tops, particularly in the folding tops of motor vehicles, the problem exists of bringing these into a sealing connection with the corresponding edge sections of the motor vehicle upon the closing of the folding top and of keeping the same permanently sealed there.

Sealing systems, in which the corresponding sealing lips of so-called mounting rails are accommodated, have been developed for this. The mounting rails are elongated, C-shaped elements, in which the opening of the "C" serves for the accommodation of sealing elements, particularly of elongated sealing strips.

Problems thereby result in the conventional simple mounting, such as the fastening of the mounting rails to the corresponding elements of the folding top rod in relation to a specific position by means of screws. Since the tolerances of the rod or of its position allow a certain clearance space, the position of the mounting rail must be correspondingly readjusted, or subsequently changed again after the mounting of the rod, so that a precise sealing effect is achieved. The adjustment of the distance of the mounting rail and of the rod is carried out, in a conventional manner, through the placement of spacing disks. This procedure is not only complicated but also extremely labor-intensive, which makes the production process considerably more expensive. In addition, the position provided can not always be reliably achieved by means of an adjustment by hand, which then leads to problems involving a lack of tightness.

SUMMARY OF THE INVENTION

The task which forms the basis of the present invention is, therefore, a process for the attachment of a mounting rail to the rod of a folding top of a motor vehicle, particularly of a convertible, which rod is at least partially premounted, if necessary, by means of which a defined securing of position is achieved, in a simple manner, through which the tolerance clearances which are brought about can be compensated.

The task which forms the basis of the present invention is, in addition, that of creating a connecting device for a mounting rail.

The solution of these tasks is achieved through the characteristics of claims 1 or 5, respectively.

In the process in accordance with the invention, the mounting rail is provided with at least one hole at a predetermined point, a tubular connecting element, which has at least one stopping surface, is inserted through the hole, the mounting rail is mounted on a first installation element, the rod is mounted on a second installation element, whereby at least one hole is or will be provided in the said rod for the accommodation of the tubular connecting element, the tubular connecting element is inserted into the hole for the rod from the one side and is, through the insertion of a mandrel-like unit from the other side, fixed in the hole for the rod, the mounting rail is moved forward up to a predetermined position on the rod, whereby the at least one tubular connecting element is plastically deformed and a connection is created between the rod and the mounting rail, and the two connecting elements are detached from the connection point.

By that means, it is achieved that a compensation of possible tolerances is achieved up to the point that the rod can be precisely positioned in relation to the vehicle, and that the mounting rail can be sealed off in relation to the edges, whereby the positioning of the elements in the correct place, as well as the connecting of the same, can both be carried out in an essentially fully automatic process. This provides considerable advantages in relation to the speed of production, on the one hand, and in regard to the savings in expenses which is connected with the same, on the other hand, whereby the process in accordance with the invention is also particularly well suited for the production of larger unit numbers of folding tops.

The plastic deformation is, in an advantageous manner, essentially carried out through the compression deformation of the tube along its length and the expansion of a frontal edge area.

The second connecting element is advantageously attached to a mounting device which is secured in its position, and the first connecting element can be moved relative to the second connecting element, both in the horizontal direction, as well as in the vertical direction. A flexible controlling of the correct position, both of the rod as well as of the mounting rail, is thereby made possible. Possibilities for the adjustment of the mounting device can, of course, be provided.

The adjustment of the correct positions of the individual elements to one another is additionally supported by the fact that the first installation element is brought into a defined final position relative to the second installation element.

In addition, the tubular connecting element is, in an advantageous manner, inserted into a hole in the rod, which [hole] has a somewhat greater internal diameter than the external diameter of the tubular connecting elements, as the result of which a correspondingly easy insertion of the tubular element into the rod is made possible before the tubular element is, for the creation of the effective connection point, deformed in a correspondingly plastic manner.

The connecting device in accordance with the invention is characterized by the fact that at least one tubular connecting element is provided, which [element] extends both through a hole in the mounting rail as well as through a hole in the rod and is at least partially plastically deformed for the production of the connection. An effective connection point can thereby be created in the simplest manner, as the result of which additional spacing elements of the type which have previously been conventional, such as spacing disks and the like, can be avoided. The connection can consequently be created by means of a single element, or by means of a single type of element.

Several connecting elements, which make possible a correspondingly effective connection of the entire mounting rail with the rod, are advantageously provided.

The connecting elements are, in an advantageous manner, positioned in the mounting rail displaced in both the horizontal direction as well as in the vertical direction. By that means, corresponding transverse forces and lateral forces can be effectively absorbed.

The tubular connecting element advantageously has a stopping surface on one of its frontal sides, as the result of which a defined position of the element is created.

In a further advantage, the tubular connecting element has at least one notch on one of its frontal sides. This is, in an advantageous manner, the other frontal side to the one that has the stopping surface. In one preferred form of implementation, the tubular connecting element has three notches, through which corresponding tongue-like elements, which are correspondingly easily deformable, are brought about.

The tubular element is, in an advantageous manner, formed from metal, as the result of which a simple and easy deformation can be produced, and a correspondingly rigid connection between the mounting rail and the rod can be produced. It is, of course, possible to form the tubular connecting element from other materials or combinations of materials which are able to undergo a corresponding deformation, if necessary, through an additional heating of the tubular connecting element upon the starting of movement into the final position of the mounting rail relative to the rod.

DESCRIPTION OF THE DRAWINGS

Further details, characteristics and advantages of the present invention emerge from the following description with reference to the diagrams. These depict the following:

FIG. 3: The connecting device of FIG. 2 in accordance with the invention, at the stage when the connection point has just been created; and:

FIG. 4: The connection point of FIG. 3 brought about, with the connecting elements removed.

DETAILED DESCRIPTION OF THE INVENTION

Figure 1:
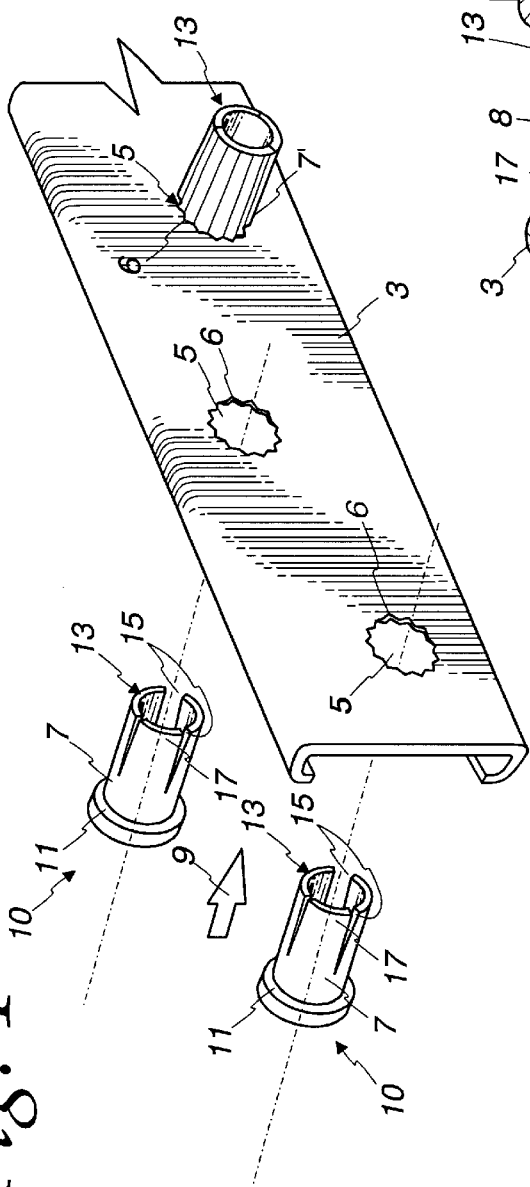
FIG. 1: In a perspective view, a mounting rail with holes and connecting elements for insertion into these holes.

A mounting rail (3) which has, as is evident, a C-shaped profile, in which the C-shaped profile is open to the rear, is depicted in FIG. 1 in a perspective view.

Perforations or holes (5), into which the tubular connecting elements (7 and 7') can be inserted, are placed in the mounting rail (3), which is depicted in cut-away form.

Two different forms of implementation of a tubular connecting element are depicted in the representation in accordance with FIG. 1. The tubular connecting elements (7 or 7') can be inserted, in accordance with the arrow (9), into the holes (5) depicted in FIG. 1, which holes have a denticulated internal circumference (6). By means of the denticulated internal circumference (6), a similar structure is impressed onto the external circumference of the tubular connecting element (7'), as the result of which a corresponding insertion effect is brought about.

The tubular connecting elements (7, 7') have, on one frontal side (10), a stopping surface (11) which, upon the insertion of the tubular connecting elements (7, 7') against the mounting rail (3). serves as a stop unit.

On the other frontal side (13), which is positioned opposite to the frontal side (10), notches (15) are provided whereby, in the example of the connecting element (7) which is depicted, three notches (15), which are located at the same angular distance from one another, are provided.

Tongue-shaped elements (17), which make an easier deformation possible, are formed by the notches (15).

The tubular connecting elements (7, 7') can be formed from metal, for example. Possible other materials, which support or make possible a plastic deformation, are also suitable, however.

Figure 2:
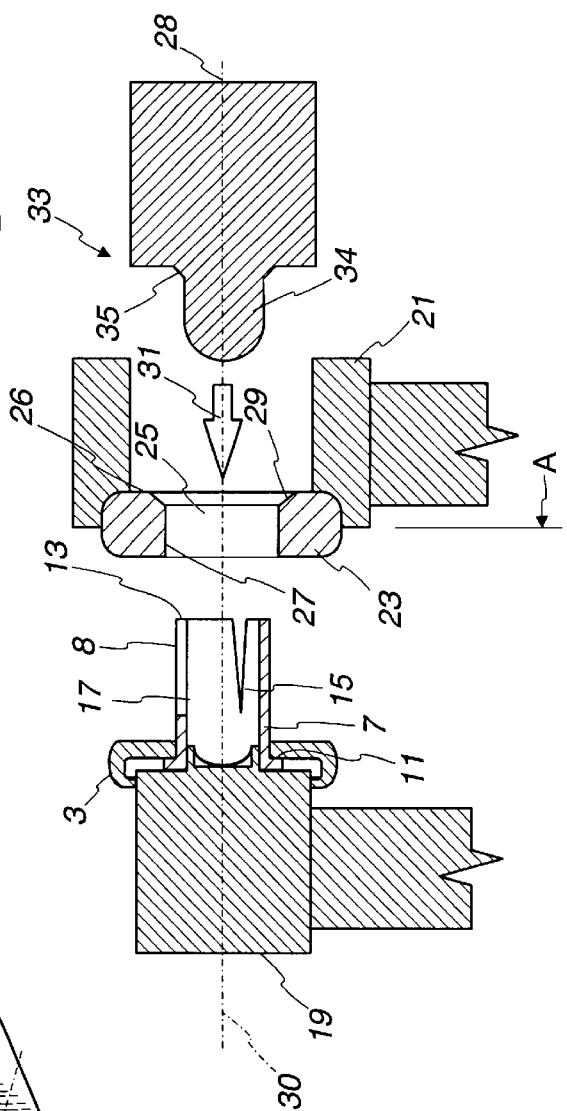
FIG. 2: A form of implementation of the connecting device in accordance with the invention during the stage before the creation of the connection point.

The method by which one preferred form of implementation of the process in accordance with the invention proceeds, as well as how a corresponding connecting point is created with the connecting device in accordance with the invention, is depicted in FIGS. 2 to 4.

The mounting rail (3) is attached and secured in its position on a first installation element. The tubular connecting elements (7 or also 7') are inserted into the mounting rail (3) and abut, with their specific stopping surface (11), against the mounting rail (3), on the one hand, and against the corresponding side of the corresponding connecting element (19), on the other hand.

A rod (23), which is, in the case of the example, a rail-shaped element, is accommodated in a second installation element (21). As many holes (25) are formed in the rod (23) as tubular connecting elements (7) are to be provided, although still more holes (25) may also be provided, if necessary, in order to create different possibilities for the selection of the connecting points, in accordance with the form of implementation of the folding top or of the rod.

The holes have an internal diameter (27) which is somewhat greater than the external diameter (8) of the tubular connecting elements (7, 7').

In addition, the hole or the holes (25) has (have) a phase adjustment area (29) expanding outwardly to the outside.

A mandrel-like unit (33), which has a protuberance (34) which can be inserted into the hole (25) in the direction of the arrow (31), is provided.

The rod (23), which can be premounted, if necessary, is, according to FIG. 2, located in a position at a reference plane (A) which defines a predetermined mounting position.

The process in accordance with the invention, three images of which are depicted in FIGS. 2 to 4, will now be represented by means of the following description.

Proceeding from the positions of the first connecting element (19), of the second connecting element (21), and of the mandrel-like unit (33), the tubular connecting element (7) is first inserted into the hole (25), whereby the frontal side (13) is preferably snugly inserted all the way into the rear external side (26).

After that, the protuberance (34) of the mandrel-like unit (33) is inserted into the interior of the tubular element (7). A conical surface (35), which is configured in such a manner that its tapering corresponds to the phase adjustment area (29), is positioned at the base of the protuberance (34).

Through the engagement of the conical surface (35) with the frontal side (13) of the tubular connecting element (7 or 7'), the tubular connecting element (7) is deformed in this area and a securing of position is produced at this point.

In order to fix the definitive position of the mounting rail (3) relative to the rod (23), the mounting rail is moved, by means of the first connecting element, into this position, whereby the tubular connecting element (7) is plastically deformed at the same time, as is evident from FIG. 3. The tubular connecting element (7) is completely fixed in its position by means of the said plastic deformation, and a connection point (40) is created.

As is evident from FIG. 3, the axis (28) of the hole (25) thereby diverges from the axis (30) of the tubular connecting element (7). A displacement relative to the position in accordance with FIG. 2 has consequently been brought about, and the tolerances in the position or in the individual components have been compensated, so that the defined final position of mounting rail (3) relative to the rod (23) has been brought about. The rod is thereby positioned in the correct position for the connection device (not depicted) with the vehicle, and the mounting rail is in the correct position for an optimal sealing, such as with the side windows of the vehicle, for example.

The stage in which the first connecting element (19) has been displaced to the left by the mounting rail, in accordance with the arrow (41), and the second connecting element (21) has, along with the mandrel-like unit (33), been displaced to the right, in accordance with the arrow (42), and in which the rod (23) has been released, is depicted in FIG. 4.

The present invention is not restricted to the examples of implementation depicted. For example, the tubular connecting elements can also have another form, such as prismatic shapes, triangular cross-sectional shapes, etc., rather than a cylindrical shape. The cross-sectional shape of the holes (25) can also have other form: for example, the phase adjustment area (29) can proceed over the entire internal diameter, and thus be correspondingly less beveled. The configuration of the protuberance (34) is then adjusted in a corresponding manner.

The first and the second connecting elements (19 and 21) are attached to corresponding mounting devices, on which the rod (23) can be premounted with the additional elements. The representations in accordance with FIGS. 2 to 4 show only one side of the rod with the mounting rail. These devices are then either constructed in a correspondingly mirror-symmetrical manner on the other side of the same mounting device, or else positioned on a device which is premounted or subsequently mounted.

In order to achieve the greatest saving of time, all of the connection points (40) are produced on both sides of the folding top simultaneously.

What is claimed is:

1. A process for the attachment of a mounting rail to a rod of a folding top for a convertible, with the steps of:

providing a mounting rail which has at least one hole at a predetermined point;

providing a rod which has at least one hole at a predetermined point, the rod having a first side and a second side, mounting the mounting rail on a first installation element;

mounting the rod on a second installation element;

inserting a tubular connecting element, which has at least one stopping surface, through the hole in the mounting rail;

introducing the tubular connecting element into the hole in the rod from the first side of the rod and fixing it, by means of the insertion of a mandrel unit from the second side of the rod, in its position in the hole in the rod;

moving the mounting rail forward towards the rod up to a predetermined position thereby plastically deforming the tubular connecting element in a space between the mounting rail and the rod and thus providing a connection between the rod and the mounting rail which are still spaced apart; and detaching both of the installation elements and the mandrel-like unit from the rod and the mounting rail.

2. The process in accordance with claim 1, further comprising the steps of attaching the second installation element to a mounting device, which is secured in a defined position, and moving the first installation element in relation to the second installation element, both in the horizontal direction as well as in the vertical direction.

3. The process in accordance with claim 2, further comprising the step of bringing the first installation element into a defined final position relative to the second installation element.

4. The process in accordance with claim 1, further comprising the step of providing a hole in the rod, which has a somewhat larger internal diameter than an external diameter of the tubular connecting element.

* * * * *